United States Patent [19]
Clasper et al.

[11] 3,771,843
[45] Nov. 13, 1973

[54] TRACK IDLER WHEEL

[75] Inventors: Thomas Clasper, Belmont; Wilfred H. Hutton, Ryton-on-Tyne, both of England; Orville E. Kessinger, Jr., Mackinaw, Ill.; Victor Randour, Aurora, Ill.; Fred E. Simpson, Oswego, Ill.

[73] Assignee: Caterpillar Tractor Co., Peoria, Ill.

[22] Filed: Oct. 22, 1971

[21] Appl. No.: 191,597

[52] U.S. Cl.............. 305/21, 74/230.3, 301/63 DD, 305/56
[51] Int. Cl.............................................. B60b 3/08
[58] Field of Search................. 301/63 DD; 305/21, 305/24, 28, 56, 32; 308/18; 74/434, 230.3, 230.5

[56] References Cited
UNITED STATES PATENTS

| | | |
|---|---|---|
| 306,070 | 10/1884 | Ferguson....................... 301/63 DD |
| 900,700 | 10/1908 | Bole................................... 74/230.3 |
| 2,926,969 | 3/1960 | Ashley................................... 305/32 |
| 3,490,285 | 1/1970 | Schaeffler......................... 74/230.5 |
| 2,284,821 | 6/1942 | Heaslet................................. 305/32 |

FOREIGN PATENTS OR APPLICATIONS 225,034 10/1959 Australia....................... 301/63 DD Primary Examiner—Richard J. Johnson
Assistant Examiner—Reinhard Eisenzopf
Attorney—Fryer, Tjensvole, Feix, Phillips & Lempio

[57] ABSTRACT

A method and apparatus in the form of a heavy-duty track idler wheel comprising two formed discs that have integrally formed outer rims and inner bosses concentrically abutting each other and joined by circumscribing weld joints.

4 Claims, 3 Drawing Figures

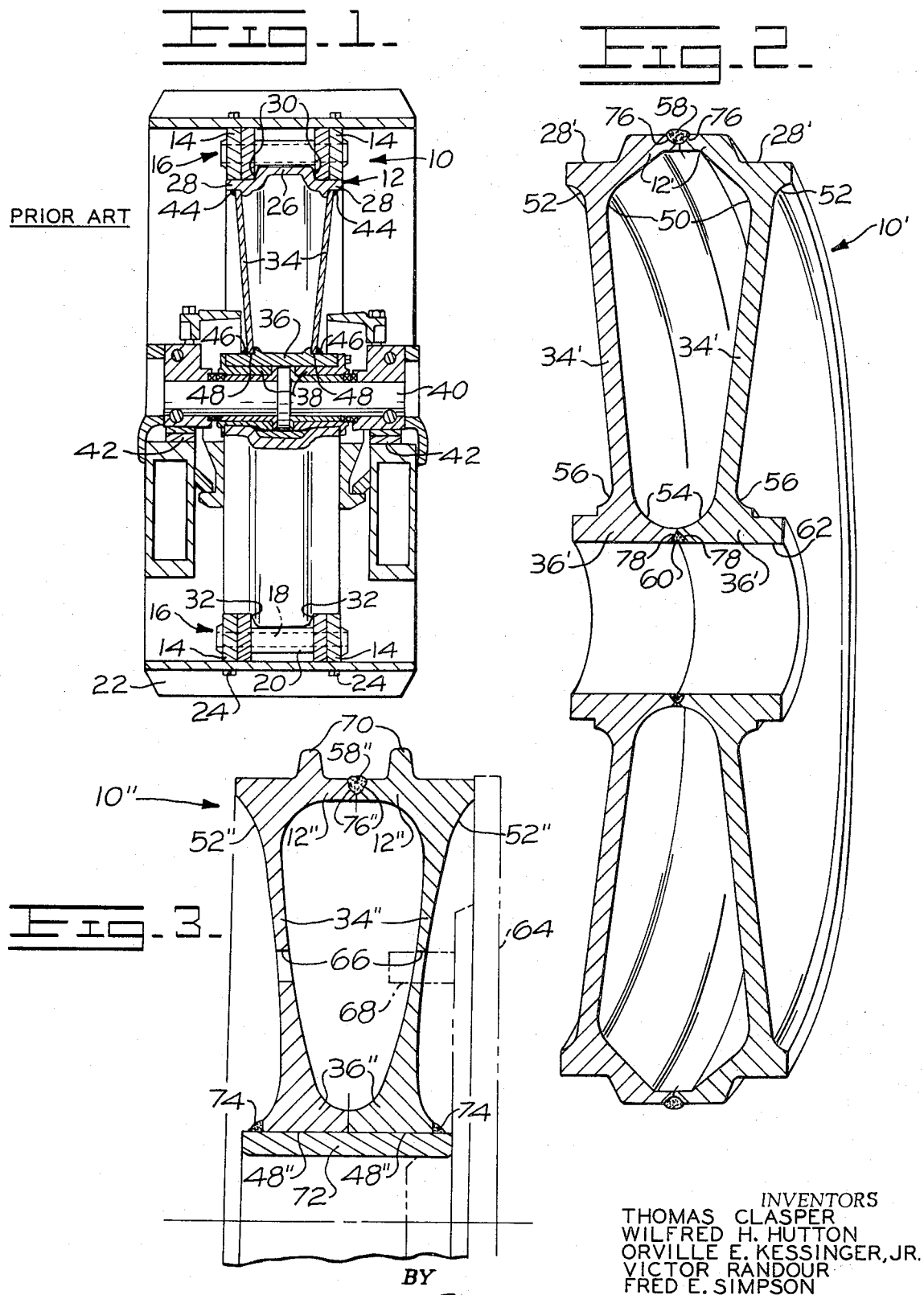

TRACK IDLER WHEEL

BACKGROUND OF THE INVENTION

Earthmoving machines, and in particular crawler tractors, are subject to some of the most severe environmental operating conditions experienced by any mechanized equipment. Crawler tractors commonly pioneer new roads and prepare virgin soil imbedded with rock and other debris that severely punish the track and other ground supporting components. The idler wheels, normally disposed at the forward end of each ground-engaging track chain that is used for motivating and steering such tractors, are particularly exposed to high rates of wear and damage due to the fact that they are subject to and absorb much of the initial shock loads generated when projecting rocks, tree stumps, etc., are encountered. Also contributing to high rates of wear and damage is the high horsepower employed with these machines. Very high quality undercarriage components are required to ensure desired long service life. To provide durable track idler wheels, manufacturers of earthmoving equipment have often provided single piece, cast steel idlers and/or have fabricated such idlers in numerous and diverse patterns in an effort to obtain increased strength for this critical track support member. In spite of these efforts, these conventional idler wheels occasionally fail when subjected to the severe service conditions aforementioned.

SUMMARY AND OBJECTS OF THE INVENTION

This invention relates to a track idler wheel especially made for heavy-duty tractor applications having two formed metallic discs disposed in abutting concentric relationship and joined by circumscribing weld joints in such a manner as to minimize stresses inherent in the composite disc idler wheel structure.

A primary object of this invention is to use two basically symmetrical, formed, metallic discs in an abutting, concentric, and coacting relationship to produce a more durable track idler wheel that is still economic to produce.

Another object of this invention is to employ formed or cast metallic discs in cooperating relationship as a track idler wheel so that as shock loads are experienced, internal stresses will be uniformly dispersed by the idler wheel.

Another object of this invention is to employ pairs of formed metallic discs in such a manner that they may be economically and expediently assembled as component parts of a track idler wheel with a minimum of manual labor.

Another object of this invention is to provide a composite wheel made up by welding a pair of discs together having a hollow space therebetween so as to take advantage of the superior strength properties of box beam construction.

Another object of this invention is to provide a composite wheel having weld joints at locations where induced loads are at a minimum.

Yet another object of this invention is to provide a composite wheel having weld joints located so as to facilitate assembly and reduce labor costs.

Another object of this invention is to provide a composite wheel made up of forged wheel discs wherein such forged wheel discs provide strength at locations where induced loads are at a maximum.

Still another object of this invention is to provide an apparatus in the form of larger and stronger idler wheels for use on earthmoving machinery and a method therefor.

Another object is to provide a more economic wheel for use in heavy-duty earthmoving applications.

BRIEF DESCRIPTION OF THE DRAWINGS

In the drawings:

FIG. 1 is a view in partial section of a conventional idler and a track chain showing how in constructing prior art idlers, two generally symmetrical metal discs are welded to a rim and inner boss to form the idler wheel;

FIG. 2 is a sectional view in perspective of the idler wheel of this invention comprising two symmetrical discs connected by circumscribing weld joints; and FIG. 3 shows a modified form of the idler wheel of this invention wherein a steel tube is employed centrally within the wheel to couple the disc members and to serve as a bearing hub structure.

DETAILED DESCRIPTION

As shown in FIG. 1, a track idler wheel generally shown at 10 and employed in the crawler chain of earthmoving tractors normally comprises a cylindrical rim section 12 of a predetermined width to coincide with laterally spaced, cooperating links 14 of a conventional articulated joined track chain shown generally at 16. Relatively rotating pins and bushings 18 and 20 pivotally couple the ends of the links to form an endless track chain which is supported on ground-engaging track shoes 22 that are secured thereby by bolts 24. A central, diametrically enlarged portion 26 of rim section 12 is normally employed intermediate two axially spaced load or rail supporting rim portions 28 so that radially extending side surfaces 30 might contact and maintain track alignment through the inner contiguous link surfaces 32.

To minimize weight of the idler, laterally spaced, disc-shaped members 34 are employed to circumferentially support the idler rim 12 upon a central boss or hub 36 that, in turn, is rotatably mounted through bearings 38 on a support shaft 40. The idler may be adapted to a recoil mechanism (not shown) for horizontal and longitudinal reciprocation upon slide bearings 42, in order to cushion shock loads as they are encountered.

As shown in FIG. 1 the idler in the area of the juncture of supporting side discs 34 and rim portions 28 exhibits abrupt changes in contour proximate to the outer circumferential weld joints 44. This allows concentrated loads generated by encountering ground-imbedded obstructions to be detrimentally applied to the idler components through the mechanism of a stress-riser relationship. The consequence of this action is that the weld joints begin to crack, propagating circumferentially about the juncture, which subsequently results in premature failure of the idler. Occasionally the high stress loads applied to the rim are transmitted through the supporting discs so as to cause the inner circumferential weld joints 46 coupling central bores 48 of the discs 34 to the tubular bearing hub 36 to fail prematurely.

As shown in FIG. 2, the track idler wheel of the instant invention shown generally at 10' has basically the same external configuration as the prior art design of FIG. 1, with the exception that sidewalls 34' have integrally formed thereon one-half of outer rim 12' and one-half of inner boss or hub section 36'. Large radii form broad transitional junctures 50,52 immediately inward of the high-impact area of each load-bearing rim 28' and about the hub section of 54,56 to minimize high stress concentrations. Integral rims and hubs with smooth transition areas are readily adaptable to both conventional and rotary forging techniques. By placing a disc upon a rotatable table (not shown) with a recess conforming to the desired shape of the idler, forming tools are brought into rotating engagement with the metal disc, and upon application of sufficient force, the material is worked into the required areas to provide the large radii and specific shape of the desired rim and hub portions.

The method of manufacture of such forged idlers will now be described with particularity. As is conventional with the production of forged railroad car wheels the steps of manufacture of the discs are as follows: (1) heating a metal billet or ingot to forging temperature; (2) forging the ingot into a solid disc; (3) forging the disc into a basic wheel shape with inner bosses and an outer rim; (4) piercing a hole through the basic wheel shape; (5) roll forging the outer rim profile to the required dimensions; and, (6) dishing (press forging) the complete forging in a press. Having thus described the conventional steps, the method of the instant invention further comprises the steps of (7) repeating steps 1–6 to produce a second wheel disc; (8) placing the two discs in side-by-side abutting relationship wherein the rims and bosses of the respective discs are in contact and (9) welding the two discs together at their points of contact.

In the alternative, steps 1–6 can be replaced by the step of casting rather than forging the wheel disc. Such casting step would be accomplished as is conventional in the art.

The overall diameter of such track idler wheels is normally small enough that they can also be manufactured on conventional, press-type forges. Specifically, forging beneficially works the material grain structure into flow patterns that provide additional strength to transition areas 50,52,54,56 as they attain their desired shapes. Homogenity of dimension of the idler wheel discs is desired because the abutting surfaces of the coacting parts must align concentrically so that an outer circumscribing weld joint 58 and an inner annular weld joint 60 can join the two discs 34' in an effective manner.

The concentric alignment of the coacting wheel discs or sections may be assured by initially machining bore 62, which is then mounted securely on a supporting pilot shaft (not shown) for subsequent machining operations of the remaining outer surfaces and edges of the rim and wheel. Rather than using the welding techniques described above, the two idler wheel hubs and rims could be inertia friction welded by rotating one disc relative to the other disc at a predetermined speed, and then bringing the two members together under substantial force and allowing the resultant wheel to come to a stop. Inertia welding equipment disclosed in the Assignee's U.S. Pat. No. 3,273,233, may be used to accomplish such welds.

Limited finish machining of the wheel often would be required to shape the external surfaces of the hub to adapt them to support bearing assemblies analogous to 38 in FIG. 1. In this case, such additional machining step would be performed subsequent to joining the two discs.

FIG. 3 shows a partial cross section view of a modified idler wheel assembly 10'' wherein two symmetrically formed discs 34'' are flared out so that substantially larger, broader junctures 52'' are employed intermediate the circular sidewalls, rim 12'', and hub section 36''. When such metal discs are placed upon rotatable forging tables or dies 64, suitable apertures 66 are normally provided in the discs to receive pilot drive pins 68 so as to maintain the radial position of the discs and to provide a drive force while they are being worked. With the subject idler, an extra tool would be employed to work the outer periphery of the rim sections 12'' so that metal displaced during sizing of the load bearing rim sections can be transferred and formed into relatively thin, outwardly extending radial flanges 70. These are the guide surfaces which are required to contact and maintain track chain alignment.

Additional strength is afforded the hub portions 36'' of the FIG. 3 embodiment by inserting and welding a section of steel tubing 72 into central disc apertures 48''. Using a tube of metal such as steel in the hub area in combination with the heavier sections of the discs at their inner bores not only affords substantially higher beam strength to resist internal loading of the idler, but also provides the opportunity to manufacture weld joints 74 by applying the weld to the outer diameter of tube 72. This is often more convenient and economical than welding joint 60 of FIG. 2, for example, since it is more difficult to make an inside weld within a tube than an outside weld as described.

With the subject embodiment, additional steps of inserting tube 72 into apertures 48'' and applying two welds 74 to the juncture between the discs and the tube are required.

It should be further noted that chamfers 76 and 78 in the embodiment of FIG. 2 and 76'' in the embodiment of FIG. 3 may be formed in the disc during the manufacture of the discs to facilitate welding.

It is to be understood that the foregoing description is merely illustrative of preferred embodiments of the invention and that the scope of the invention is not to be limited thereto, but is to be determined by the scope of the appended claims.

What is claimed is:

1. An idler wheel comprising a pair of generally symmetrical circular wheel discs of integral one-piece construction, each wheel disc having an enlarged axially directed circular outer rim and an axially directed circular inner boss, said rim and boss being joined by a generally radially directed wall, said wheel discs being in side-by-side abutting relationship wherein the respective rims and bosses of each wheel disc are in contacting relation over a circular line of contact forming a juncture between the wheel discs, said bosses defining a generally centrally located cylindrical bore through the wheel, means joining said wheel discs together comprising a circumscribing weld peripherally around the line of contact forming the juncture between the rims at the radially outermost part of the wheel and the bosses at the radially innermost part of the wheel within the cylindrical bore, so as to form a composite idler wheel having a hollow space therein, and wherein each rim comprises a load bearing shoulder portion directed axially away from the other wheel disc of the pair and a central flange portion of greater diameter than the shoulder portion, said central flange portion defining a generally radially directed side surface portion and a generally axially directed portion, said side surface portions adapted for maintaining track alignment.

2. The invention of claim 1 wherein the discs are formed so as to include large radii transition junctures at the juncture of the rim to the wall at a location inward of the load bearing shoulder portion so as to minimize stress concentrations.

3. The invention of claim 2 wherein the large radii transition junctures are located radially inward of the shoulder portion.

4. The invention of claim 2 wherein the discs are further formed so as to include large radii transition junctures at the juncture of the boss to the wall.

* * * * *